United States Patent
Wittenberg

(10) Patent No.: US 9,810,774 B2
(45) Date of Patent: Nov. 7, 2017

(54) SHORT-RANGE POINT DEFENSE RADAR

(71) Applicant: The Boeing Company, Chicago, IL (US)

(72) Inventor: Peter S. Wittenberg, Creve Coeur, MO (US)

(73) Assignee: The Boeing Company, Chicago, IL (US)

(*) Notice: Subject to any disclaimer, the term of this patent is extended or adjusted under 35 U.S.C. 154(b) by 397 days.

(21) Appl. No.: 14/540,116

(22) Filed: Nov. 13, 2014

(65) Prior Publication Data

US 2016/0139254 A1  May 19, 2016

(51) Int. Cl.
| | | |
|---|---|---|
| *G01S 7/35* | (2006.01) | |
| *G01S 13/34* | (2006.01) | |
| *G01S 13/44* | (2006.01) | |
| *G01S 13/58* | (2006.01) | |
| G01S 7/00 | (2006.01) | |
| G01S 13/00 | (2006.01) | |
| G01S 13/02 | (2006.01) | |

(52) U.S. Cl.
CPC ............ *G01S 7/354* (2013.01); *G01S 13/343* (2013.01); *G01S 13/4463* (2013.01); *G01S 13/584* (2013.01); *G01S 13/003* (2013.01); *G01S 2007/356* (2013.01); *G01S 2013/0263* (2013.01)

(58) Field of Classification Search
CPC ... G01S 7/02; G01S 7/35; G01S 7/352; G01S 7/354; G01S 2007/356; G01S 13/003; G01S 13/02; G01S 13/06; G01S 13/08; G01S 13/32; G01S 13/34; G01S 13/343; G01S 13/42; G01S 13/44; G01S 13/4463; G01S 13/50; G01S 13/58; G01S 13/583; G01S 13/584; G01S 2013/0236; G01S 2013/0245; G01S 2013/0263; G01S 13/345; G01S 13/87; H01Q 3/22; H01Q 3/26

See application file for complete search history.

(56) References Cited

U.S. PATENT DOCUMENTS

| | | | | |
|---|---|---|---|---|
| 3,308,456 A | * | 3/1967 | Levenson | H01Q 3/42 342/157 |
| 3,412,396 A | * | 11/1968 | Mooney, Jr. | G01S 13/02 342/373 |
| 3,438,035 A | * | 4/1969 | Fling | H01Q 3/22 342/371 |
| 3,448,452 A | * | 6/1969 | Mooney, Jr. | G01S 13/87 342/59 |

(Continued)

OTHER PUBLICATIONS

Merrill I. Skolnik, "Introduction to Radar Systems"; second edition; McGraw-Hill Book Company; New York, NY, USA; copyright 1980; ISBN 0-07-057909-1; pp. 280, 322, 323, 388, and 389.*

*Primary Examiner* — Bernarr Gregory
(74) *Attorney, Agent, or Firm* — Ostrager Chong Flaherty & Broitman P.C.

(57) ABSTRACT

A multi-beam frequency-modulated continuous wave (FMCW) radar system designed for short range (<20 km) operation in a high-density threat environment against highly maneuverable threats. The multi-beam FMCW system is capable of providing continuous updates, both search and track, for an entire hemisphere against short-range targets. The multi-beam aspect is used to cover the entire field of regard, whereas the FMCW aspect is used to achieve resolution at a significantly reduced computational effort.

20 Claims, 9 Drawing Sheets

(56) References Cited

U.S. PATENT DOCUMENTS

| | | | |
|---|---|---|---|
| 5,652,589 A * | 7/1997 | Ono | G01S 13/345 342/70 |
| 6,104,343 A * | 8/2000 | Brookner | H01Q 3/26 342/372 |
| 7,071,867 B2 | 7/2006 | Wittenberg et al. | |
| 7,167,126 B2 | 1/2007 | Wittenberg et al. | |
| 2006/0220949 A1 * | 10/2006 | Nohmi | G01S 7/35 342/160 |

* cited by examiner

SHORT-RANGE POINT DEFENSE RADAR

BACKGROUND

This disclosure generally relates to systems and methods for tracking a moving target and, in particular, relates to short-range point defense systems for the defense of a single object or a limited area, e.g. a ship, building or an airfield, against incoming artillery, rockets, mortar rounds and missiles.

Radar devices, such as real beam radars, laser radars, sonar, and the like, transmit signals, such as electromagnetic or sonar signals, that advantageously reflect off targets and are received by the radar device to provide data related to the position of the target. Targets detected by radar devices may be stationary or moving objects. Radar devices typically comprise an antenna that transmits and receives the radar signals. Signals received by the radar device provide target data, such as the target's distance from the radar device or size. Some radar devices, such as a radar device used for short-range point defense, typically rotate the antenna through 360 degrees to detect targets within the area swept by the antenna, such as an area proximate the short-range point defense radar device.

To track a moving target, radar devices typically detect the motion of the target based upon Doppler information provided by the radar signals that are reflected off the moving target. The movement of the target in a radial direction, relative to the radar device, causes the radar signals that reflect off the moving target to return to the radar device with a frequency that is different than the frequency that was transmitted by the radar device. Specifically, the radial movement of the target changes the frequency of the radar signal an amount that is proportional to the relative velocity of the target such that the change in frequency of the radar signal may be used to determine the location and speed of the moving target and to accordingly track the moving target.

While development of active electronically scanned array (AESA) technology offers the opportunity to design radar systems for various short-range anti-missile and counter rocket, artillery and mortar (CRAM) applications, the technology of multi-beam FMCW offers some promise of lower cost, more accurate radars compared to AESA technology.

Except for widely separated bistatic systems, radar designers typically think of frequency-modulated continuous wave (FMCW) radars for extremely short-range operation and against a target set without small targets. In fact, FMCW radar technology has transcended most of these performance barriers, but the technology is still used in a limited set of applications.

FMCW radar has multiple advantages compared to pulsed radars, including at least the following: (a) much lower peak power than pulsed radars; (b) much reduced receive digital bandwidth requirement compared to pulsed radars; (c) much higher range resolution compared to pulsed radars; and (d) design freedom to separate transmit and receive antennas. Likewise multi-beam digital beamforming has advantages compared to pulsed radar, including at least the following: (a) searches the entire field of regard in each sweep; and (b) greatly improved tracking capability for multi-beam systems.

In view of the foregoing advantages, it would be desirable to provide a multi-beam FMCW radar system suitable for use as a short-range point defense system.

SUMMARY

The subject matter disclosed in detail below is directed to multi-beam FMCW radar systems designed for short range (<20 km) operation in a high-density threat environment against highly maneuverable threats in three dimensions. The basic concept of the multi-beam FMCW systems disclosed herein is to get continuous updates, both search and track, for an entire hemisphere against short-range targets. The multi-beam aspect will be used to cover the entire field of regard, whereas the FMCW aspect will be used to achieve resolution at a significantly reduced computational effort. Preferably, the multi-beam FMCW radar systems disclosed herein should be able to operate over a hemisphere.

More specifically, in a multi-beam FMCW radar system suitable for use as a short-range point defense system, the transmit beam should be able to cover the entire field of regard. Power levels on transmit should not be excessive. On the receive side, multiple beams are used to cover the field of regard. Ideally, the receive side will be covered with many overlapping beams. The intent is to cover the entire field of regard with high-gain beams.

When the signals return to the receiver from the target, they need to be formed into multiple receive beams, and this needs to be done with a computationally realistic processing load. There are numerous engineering tradeoffs involved in this, including angular accuracy and range resolution.

The system should be able to operate with a something close to a typical exciter with some modifications that may be desirable.

Also, the signal processing load for a multi-beam system needs to be examined. As with the beam formation (another signal processing issue), the signal processing must be possible to do with reasonable computers. It must be possible to produce the discriminants in range, velocity, azimuth, and elevation used in tracking, In addition, there should be some target identification hardware and software available for the system.

Finally, the complete system must be able to cover a hemisphere. In practice, this means that several radars facing different directions will combine to provide hemispherical coverage.

One aspect of the subject matter disclosed in detail below is a method for simultaneous detection of multiple short-range targets using radar, comprising: (a) illuminating a wide field of regard with frequency-modulated continuous wave radar signals comprising a sequence of sweeps using a transmit antenna; (b) for each sweep of the sequence, receiving radar signals reflected from the field of regard within a short range using a receive antenna array having a multiplicity of antenna elements; (c) converting the reflected radar signals into a respective multiplicity of pencil beams for each sweep of the sequence using two-dimensional beamforming; and (d) for each sweep of the sequence, detecting any pencil beams of the multiplicity of pencil beams having a characteristic indicative that radar signals were reflected from a target in the field of regard, wherein the two-dimensional beamforming and the target detection are performed by a computer system.

In accordance with some embodiments, step (c) comprises: converting the received radar signals into respective digital in-phase and quadrature samples for each antenna element; forming a respective multiplicity of simultaneous azimuth beams from the digital in-phase and quadrature samples for each sweep of the sequence, the azimuth beams of each multiplicity being aimed at respective azimuth angles; and forming the respective multiplicity of pencil beams from the azimuth beams for each sweep of the sequence using elevation beamforming.

In those same embodiments, step (d) comprises: forming a multiplicity of range bins for each pencil beam; Doppler processing the range bins across multiple sweeps; and computing a range of the target based on results of the Doppler processing.

The method may further comprise starting a track on the target when an M of N target detection threshold is reached, where M and N are positive integers and M<N, and thereafter continuously updating the track on the target. The track may be continuously updated every coherent integration time. Also, this method may further comprise computing azimuth and elevation angles of the target using angle discrimination.

Another aspect of the subject matter disclosed herein is a radar system capable of simultaneous detection of multiple short-range targets, comprising: an exciter capable of generating frequency-modulated continuous wave radio frequency signals comprising a sequence of sweeps; a receiver comprising a multiplicity of mixers for mixing radio frequency signals with replicas of the frequency-modulated continuous wave radio frequency signals and outputting analog signals; one or more antennas for converting frequency-modulated continuous wave radio frequency signals generated by the exciter into electromagnetic waves and converting returned electromagnetic waves into radio frequency signals which are sent to the receiver; means for converting analog signals from the receiver into digital samples; a digital azimuth beamformer that forms a multiplicity of narrow azimuth beams from digital samples produced for each sweep; a digital elevation beamformer that forms a multiplicity of pencil beams from the multiplicity of narrow azimuth beams produced for each sweep; and a digital signal processor programmed to detect any pencil beams of the multiplicity of pencil beams having a characteristic indicative that radar signals were reflected from a target in the field of regard for each sweep.

In accordance with some embodiments, the digital signal processor is programmed to perform the following operations: forming a multiplicity of range bins for each pencil beam; Doppler processing the range bins across multiple sweeps; and computing a range of the target based on results of the Doppler processing.

The radar system may further comprise a track processor programmed to start a track on the target when an M of N target detection threshold is reached, where M and N are positive integers and M<N. The track processor is further programmed to continuously update the track on the target.

A further aspect is a method for simultaneous detection of multiple short-range targets using radar, comprising: (a) illuminating a wide field of regard with frequency-modulated continuous wave radar signals comprising a sequence of sweeps using a transmit antenna; (b) for each sweep of the sequence, receiving radar signals reflected from the field of regard within a short range using a receive antenna array having a multiplicity of antenna elements; (c) converting the reflected radar signals into a respective multiplicity of fan beams for each sweep of the sequence using two-dimensional beamforming; (d) for each sweep of the sequence, detecting any fan beams of the multiplicity of fan beams having a characteristic indicative that radar signals were reflected from a target in the field of regard; and (e) forming a multiplicity of pencil beams for any fan beam for which a target was detected, wherein the two-dimensional beamforming and steps (d) and (e) are performed by a computer system.

Yet another aspect is a radar system capable of simultaneous detection of multiple short-range targets, comprising: an exciter capable of generating frequency-modulated continuous wave radio frequency signals comprising a sequence of sweeps; a receiver comprising a multiplicity of mixers for mixing radio frequency signals with replicas of the frequency-modulated continuous wave radio frequency signals and outputting analog signals; one or more antennas for converting frequency-modulated continuous wave radio frequency signals generated by the exciter into electromagnetic waves and converting returned electromagnetic waves into radio frequency signals which are sent to the receiver; means for converting analog signals from the receiver into digital samples; a digital azimuth beamformer that forms a multiplicity of narrow azimuth beams from digital samples produced for each sweep; a first digital elevation beamformer that forms a multiplicity of fan beams from the multiplicity of narrow azimuth beams produced for each sweep; a digital signal processor programmed to detect any fan beams of the multiplicity of pencil beams having a characteristic indicative that radar signals were reflected from a target in the field of regard for each sweep; and a second digital elevation beamformer that forms a multiplicity of pencil beams for any fan beam for which a target was detected. This radar system may further comprise digital angle discrimination means for computing azimuth and elevation angles of the target for any pencil beams of the multiplicity of pencil beams having a characteristic indicative that radar signals were reflected from a target in the field of regard.

Other aspects of multi-beam FMCW radar systems suitable for use as point defense systems and their methods of operation are disclosed below.

BRIEF DESCRIPTION OF THE DRAWINGS

Reference will hereinafter be made to the drawings in which similar elements in different drawings bear the same reference numerals.

DETAILED DESCRIPTION

Figure 1:
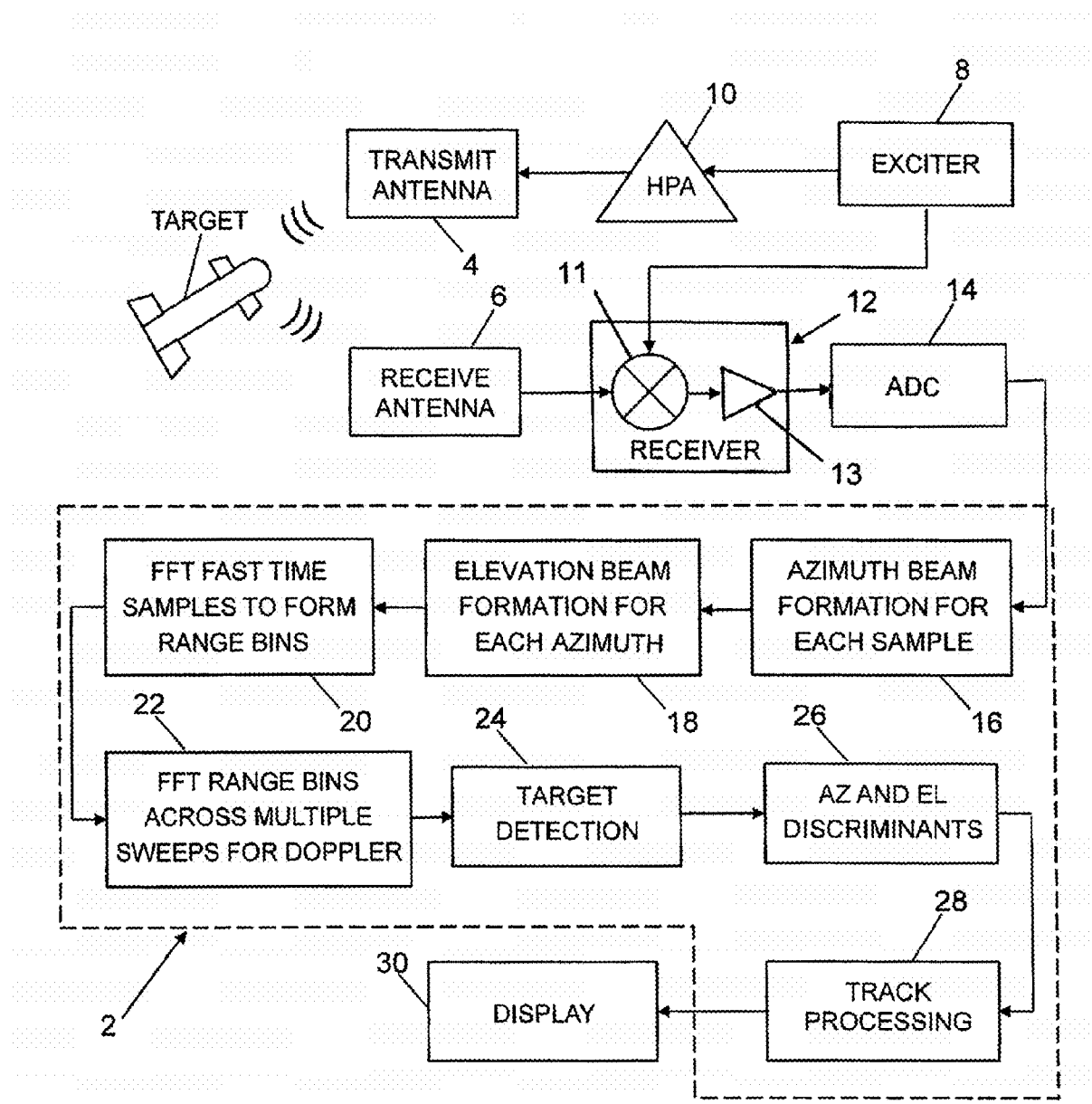
FIG. 1 is a block diagram showing some components of a Doppler multi-beam FMCW two-dimensional (2-D) stare-while-scan radar in accordance with one embodiment.

The point defense radar systems and methods disclosed herein employ frequency-modulated continuous waves (FMCW) and digital multi-beamforming. The use of multi-beam FMCW technology offers some promise of lower-cost, more-accurate radars compared to AESA technology. More specifically, multi-beam FMCW technology has the following advantages over AESA technology.

FMCW, with 100% duty factor, offers in theory and practice the lowest possible peak power of any radar technology. AESA radars (the most advanced pulsed radars) are typically run at most about 20% duty factor, with an absolute thermal limit of about 30% duty factor. Many of the AESA operations, particularly those that require unambiguous range, are run at about 15% duty factor. Using these measures of duty factor, FMCW radar can achieve the same range while having a peak power only 15 to 20% that of a well-designed pulse radar.

For a pulsed radar, the digital bandwidth required is approximately c/(2×Range bin width)=150 MHz/(Range bin width in meters). Basically, the sample rate must match the range bin size for a pulsed radar. For example, a 10-m range bin size for a pulsed radar will require complex sampling (I/Q) at 15 MHz. In practice, this is typically achieved today by a design involving real sampling at 15*4=60 MHz, but the complex sampling rate used in the radar signal process is 15 MHz.

For an FMCW radar, target range is essentially converted into a frequency shift. What this means is that, exactly like stretch processing, the range bins are actually implemented as Doppler filters. For a Doppler filter, the required digital complex sampling rate is 1/(Doppler filter width). The Doppler filter width is in turn related to the linear FM slew rate and the time of slewing. To meet a 10-m requirement, the FMCW does need to transmit a 15-MHz bandwidth, just as does the pulsed radar. However, on the receive side, the FMCW radar only has to pick up the frequencies of interest. For example, if one uses the same 10-m range bin requirement mentioned earlier, one can assume a 2-msec linear FM frequency slew over the required 15 MHz. While all of the frequency shifts would initially seem to be of interest, the 15-MHz frequency shift would correspond to a 2-msec time delay, which is a 300-km range. In this system, one would typically not be interested in anything that would be beyond 20 km (short range), so only the appropriate frequency shifts need to be collected, which would be between 0 Hz and 15 MHz/30=0.5 MHz. In this particular case, the FMCW system allows a reduction in sampling rate by a factor of 30 compared to pulsed radars.

Thus a short-range FMCW system can support many more channels than a pulsed radar. An FMCW radar system with 32 receive channels can have the same digital bandwidth as a 1-channel pulsed radar. This is one of the important factors in the lower cost of sophisticated FMCW systems relative to pulsed radars.

Instead of using the reduced digital bandwidth FMCW advantage directly, it is possible to have much smaller range bins. With an FMCW system, the range is converted to a frequency shift on the returned signal, so all that is needed to have smaller range bins is to increase the sweep, and this entails a relatively simple modification to the software in the exciter.

As an example, FMCW having a 15-MHz bandwidth would result in a 10-m range resolution in a 2-msec linear FM sweep. If a 5-m resolution is desired, then the sweep in the 2-msec sweep time can be changed to 30 MHz. If one were to choose to use this 5-m resolution over only 5 km, only 1000 range bins would be used (usually the number of range bins is a power of 2 so computationally efficient Fast Fourier Transforms (FFTs) can be used, so one would likely use $2^{10}$=1024 range bins).

One application of such a FMCW radar is for point defense systems. Range accuracy becomes more critical at closer range than at longer range to direct intercepts, so one can achieve an increase in resolution without an increase in computation by trading off the range swath covered. One potential way this could be applied is, when targets are coming in to very close range, to simply change the waveform to a higher-resolution waveform and increase the range accuracy. Although such a change does have global impact on the entire current field of view of the radar, it will likely be feasible to operate in this manner for selected targets. Another value of the option is to send out very high-resolution sweeps (perhaps 1.2 GHz) to achieve a resolution of 0.15-m range bins on the target of interest so that perhaps 150 m of range would get a detailed focus. This would be useful in both identification of the threat, resolution against decoys, and in tracking (a missile directional change would show up very quickly as a change in the apparent length of the high-range resolution waveform). Such a sweep for range only could be accomplished in 1 or 2 msec, so it will not have a significant impact on the radar timeline. Note that such a time is much faster than a high range resolution can be accomplished for most pulsed radars.

In a pulsed radar, the same antenna is used for transmit and receive. In an FMCW radar, while it is possible to use a single antenna for both transmit and receive, it is not required. What is needed is to achieve as much isolation as feasible between transmit and receive. This might mean that the transmit antenna is on one end of a ship while the receive antenna is on the other. The antennas must cover the same field of regard, but the placement is not critical.

For a ship, one of the advantages is that the transmit antenna will be small, light, and can be placed relatively easily on a higher mast. In fact, it is not really required that the transmit antenna be on the ship itself, although it would be preferable to keep it close. An escorting ship could, for example, supply the transmitter and the radiated RF signal.

If the transmit and receive antennas are physically separated, attention must be paid to achieve sufficient isolation. There are potential alternatives to having a lossy line from the exciter to the transmitter and the receiver. These designs would be derived from known distributed coherent arrays.

The digital formation of multiple receive beams by the radar systems (disclosed in detail below) also offers many advantages over the more conventional single transmit and receive beams usually used with AESA and mechanically scanned antenna (MSA) radars. The basic idea here is that there is a transmit beam that illuminates the entire field of regard. On the receive side, the formation of multiple simultaneous beams allows the radar to receive information from the entire field of regard for every sweep. While the transmit beam has lower gain than is the case for a more conventional radar, the continuous operation provides improvements that make up for a significant fraction of the gain loss.

The biggest single advantage of the multiple receive beams (and some other benefits derive from this) is that a search is conducted with every linear FM sweep. In the previous example, a sweep was made in 2 msec. During that time period, data can be collected to enable searches through the entire field of regard. A search of the entire field of regard generally results in a reduced detection range. That tends to make a multi-beam radar system most useful in situations in which the radar is not absolutely power-limited. This does include a variety of short-range situations such as for point defense, and likely includes radar ground mapping from most UAVs, helicopter radars, and some missile seekers.

In a typical radar, a track is updated every few seconds. In a more advanced AESA radar, the track is updated as it needs to be updated to maintain the desired level of track quality. This may well influence how long an integration time is used on a target and will control how often a particular target is updated. In the AESA radar, track may be viewed as stealing time from search. The radar must prioritize whether to search or track at a given time, and how long to spend on its track.

In a multi-beam radar of the type described herein, all target tracks get update information from each data collection period. The tracks are updated without taking any time away from search, and the updates for the tracks are continuous. In actual testing with ground surveillance radars, it was found that the multi-beam radar will typically have 50 times the update rate for targets. Looking at the accuracy of the track inputs, the track would be $50^{1/2} \approx 7$ times better than that achieved with a tracker for a mechanically scanned antenna. An AESA does make available more timeline because it can be moved from one position to another instantly, but using more track time will take away from search. The multi-beam system will typically have an improvement of a factor of 3 over AESA radars.

In addition to the tracking accuracy improvement in terms of a reduction in the impact of thermal noise, the continuous track enables much greater accuracy during target maneuvers, which is important in point defense applications.

In addition, the continuous updates offer a better likelihood of eliminating false alarms. While this is usually not a severe problem for air defense, it remains a significant issue for radars detecting and tracking targets on the surface of the Earth.

One embodiment of a multi-beam FMCW radar system will now be described for the purpose of illustration. The specific details set forth below may be varied in many respects without departing from the scope of the claims appended hereto.

FIG. 1 is a block diagram showing some components of a Doppler multi-beam FMCW 2-D stare-while-scan radar in accordance with one embodiment. In a stare-while-scan radar, the multiplicity of receive beams for each transmit beam allow the radar to observe a number of directions simultaneously.

The radar system graphically depicted in FIG. 1 comprises a transmit antenna 4 and a receive antenna 6. As depicted in FIG. 1, the transmit antenna 4 transmits FMCW radar signals. The transmit antenna 4 for this system needs to cover the entire field of regard.

If a target is present within the field of regard, some radar signals will be reflected and/or backscattered by surfaces of the target. Some of those radar signals will impinge on the receive antenna 6. The receive antenna 6 is made up of a number of receive antenna elements. The receive antenna elements must cover the entire field of regard of the transmit antenna 4.

Referring again to FIG. 1, the exciter 8 in the radar system generates pure radio frequency electrical signals and the timing for the radar. The exciter 8 for the proposed FMCW system will be very much like that of a pulsed radar. In accordance with one embodiment, the signal can be linear frequency-modulated continuous waves. These FMCW radio frequency signals are output to a high-power amplifier 10 (HPA in FIG. 1). The amplified FMCW radio frequency signals from high-power amplifier 10 in turn are converted into transmitted electromagnetic waves by the transmit antenna 4.

The receive antenna 6 converts impinging electromagnetic waves into electrical receive signals. Each element of the receive antenna 6 is coupled to a respective receiver 12. Each channel of receiver 12 comprises a respective mixer 11, in which a replica of the transmit signal is mixed with the receive signal to extract the baseband (I/Q) information from the radio frequency carrier signal, and an amplifier 13. The mixer 11 receives radio frequency signals and outputs an analog signal.

The analog signal is converted to a digital signal by a respective analog-to-digital converter (ADC) 14. This digital signal over time comprises a succession of digital samples. As used herein, the term "sample" refers to a single ADC I/Q output at a point in time for a single receive antenna element. These digital samples are output to a computer system 2.

The computer system 2 comprises one or more computers or processors having software modules for performing various functions, such as beam formation, Fast Fourier transformation, target detection, angle discrimination, track processing, and graphic display control.

The digital samples output by the ADC 14 are formed into simultaneous receive antenna beams in a two-step process.

The first step of this process is azimuth beam formation performed by the azimuth beam formation module 16. The azimuth beam formation is carried out identically for each row in the array. Any number M of azimuth beams can be formed for N antenna elements in the row of interest. The digital I/Q samples are multiplied by respective complex weights $w_k$ and then the products are summed to form an azimuth beam.

The second step is elevation beam formation performed by the elevation beam formation module 18, which combines the outputs of the azimuth beams that were previously formed from the signals received by the rows of receive antenna elements. The operation of the elevation beam formation module 18 is similar to what is done in the azimuth beam formation module 16 except that the input is the azimuth beams rather than the samples from the row elements and the weighting is done in the vertical rather than horizontal dimension. A multiplicity of pencil beams are formed for each azimuth angle.

The most straightforward approach is to perform the same set of operations for computing the elevation beams that were used to compute the azimuth beams, except that the computer system 2 will add together row information for the narrow azimuth beams already computed. This method is appropriate in situations where there is not a computational loading problem.

In accordance with the embodiment depicted in FIG. 1, the result of digital beamforming operations is a multiplicity of pencil beams covering the field of regard in the azimuth and elevation directions for each sample time. For example, in the case of a 32×32 receive antenna array, 32 narrow azimuth beams may be formed and then 1,024 pencil beams may be formed.

Those pencil beams are then processed by a range binning module 20 using fast Fourier transforms (FFT) in fast time to form a respective multiplicity of range bins from each pencil beam. Those range bins are then processed by a Doppler processing module 22 using fast Fourier transforms (FFT) in slow time to relate the same range bins for a multiplicity of sweeps for each pencil beam. Doppler processing, which depends on frequency domain processing, enables use of the relative velocity of any object in the field of regard. By measuring the Doppler rate, the relative velocity of objects returning echoes to the radar system can be measured in a well-known manner. The FFTs of the Doppler processing module 22 form a bank of narrow digital Doppler filters with overlapping frequency bandwidth, which filters are used to detect Doppler frequency. A digital Doppler filter is an FFT looking at the same range bin for each sweep. There is a separate Doppler filter for each range bin. For example, assume that computer system 2 is looking at what amounts to the $323^{rd}$ range bin (which is really formed by doing a fast time FFT). Now take the $323^{rd}$ range bin for the first sweep, the $323^{rd}$ range bin for the second sweep, the $323^{rd}$ range bin for the third sweep, and so on until the $323^{rd}$ range bin for the K-th sweep. The Doppler processing module 22 takes the complex output for each of those $323^{rd}$ range bin sweeps and performs a FFT to create Doppler filters that operate in slow time.

Following Doppler processing, the Doppler frequency shifts are sent to a target detection module 24. The target detection process bears some similarity to that of other types of radar. The radar system disclosed herein provides continuous updates everywhere in the field of regard, which allows detection processing to be set with an M of N detection threshold, where M and N can be fairly large because they do not negatively impact the radar timeline. Based on the Doppler frequency shifts and the transmitter frequency ramp timing, the target detection module 24 determines round-trip delay time and therefore range for each object. The azimuth and elevation angles of each object are also determined with a resolution corresponding to the angular dimensions of each pencil beam.

Once detection is achieved for a target, the resulting low-resolution target angular position data is refined by an azimuth and elevation discrimination module 26, which determines azimuth and elevation angles for the target with greater precision.

Still referring to FIG. 1, a track processing module 28 provides continuous updating of tracks for all objects detected in the field of regard. The continuous updates should allow the tracker to achieve high accuracy during target maneuvers. The target tracks are then sent to a display device 30 for display.

One proposed implementation of the embodiment depicted in FIG. 1 is based on the assumptions for detection range against targets listed in Table 1.

TABLE 1

| Assumptions for Detection Range | |
|---|---|
| Transmit Peak Power | 50 W |
| System RF | 17 GHz |
| Transmit Antenna Height (csc² el pattern) | 0.5 m |
| Transmit Antenna Width | 0.018 m |
| Receive Antenna Height | 0.5 m |
| Receive Antenna Width (16λ = 32 × λ/2) | 0.282 m |
| Integration Time (32 sweeps of 2 msec each) | 0.064 sec |
| Losses | 3 dB |
| Noise Figure | 3 dB |
| Duty factor | 1 |
| Transmit Gain | 25.4 dB |
| Receive Gain | 37.4 dB |
| Transmit Elevation Beamwidth | 2.0° |

TABLE 1-continued

| Assumptions for Detection Range | |
|---|---|
| Receive Elevation Beamwidth | 2.0° |
| Receive Azimuth Beamwidth | 3.6° |
| Required SNR (assumes M of N detection) | 6 dB |

Figure 2:
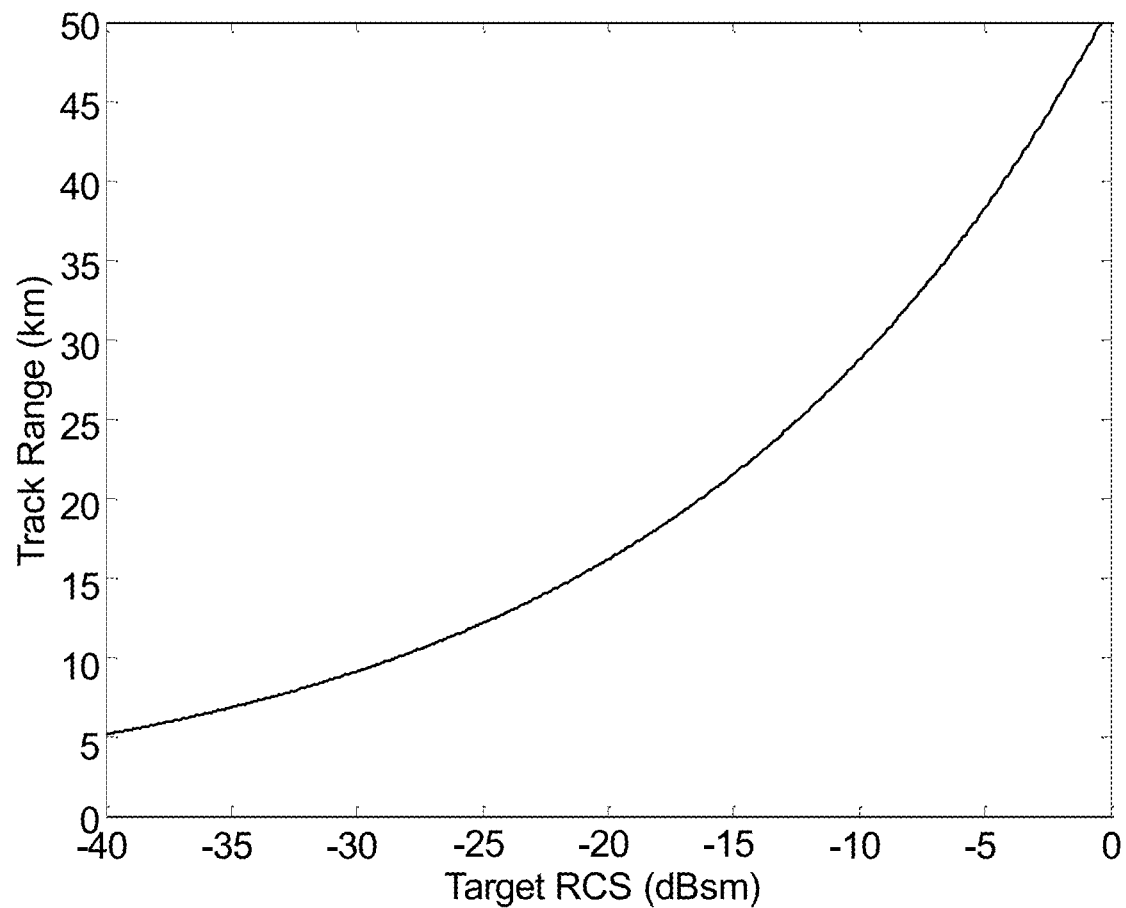
FIG. 2 is a graph showing target range in kilometers versus the radar cross section (RCS) of a target in dB($m^2$) (i.e., decibel relative to one square meter) for a proposed implementation of the embodiment depicted in FIG. 1.

An approximation to the detection range of the proposed system can be obtained by using the radar equation. Using the radar equation for this analysis, the system described in Table 1 will have the ability to detect a target of 1 m² at a range of 51 km. FIG. 2 is a graph showing target range in kilometers versus the radar cross section (RCS) of a target in dB(m²) (i.e., decibel relative to one square meter) for the proposed implementation. $R^4$ scaling provides an estimate of system performance from the 1-m² track range. The power reflected by the target is proportional to its RCS.

Referring again to Table 1, the system peak power of only 50 W is sufficient for the radar to operate, but challenging for a hostile force to detect and apply countermeasures. The transmit gain is considerably lower than systems designed to use pencil beam antenna patterns.

Referring again to FIG. 1, the transmit antenna 4 for this system needs to cover the entire field of regard, but it is desirable to have a higher gain for regions that require longer range coverage. As with most radars, this amounts to having a higher gain at lower elevations and reducing the gain at higher elevations. In accordance with one embodiment, the transmit antenna 4 has a cosecant squared antenna beam pattern. (In practice, a cosecant squared pattern can be achieved by a deformation of a parabolic reflector.) The cosecant squared antenna beam pattern is designed so that the target, when flying in at constant altitude, has a constant signal-to-noise ratio (SNR).

Figure 3:
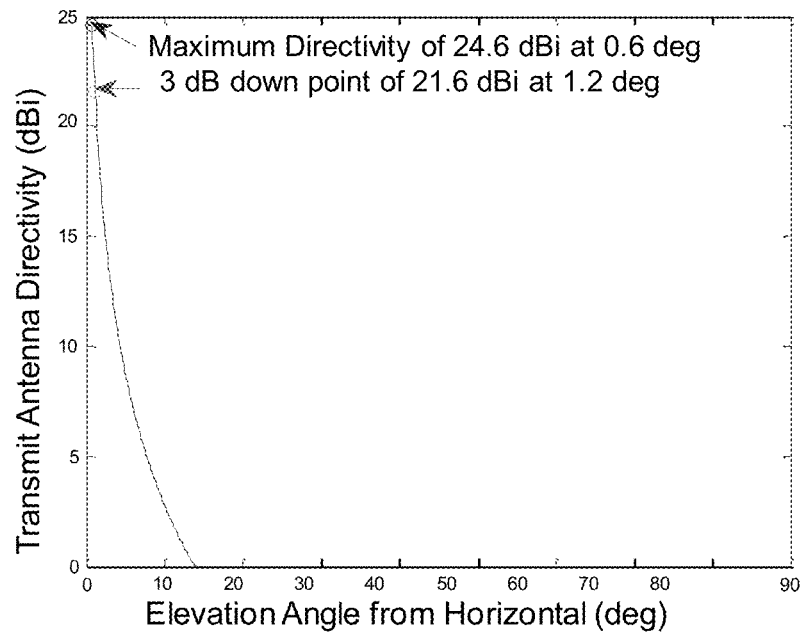
FIG. 3 is a graph showing transmit antenna directivity (in dBi) versus elevation angle from horizontal (in degrees) for an ideal cosecant squared antenna pattern.

For this design iteration, one can choose the cosecant squared gain pattern in elevation for transmit. The azimuth pattern will cover 90 degrees in azimuth uniformly. As more experience is gained with the operation of the system, it may be desirable to tweak the pattern from this initial design. FIG. 3 is a transmit antenna elevation cut showing an ideal cosecant squared antenna pattern. The peak is limited to about 25 dBi on the top end and to 0 dBi on the bottom end. The proposed transmit antenna has a peak of about 24 dB directivity at very low elevation. Transmit power falls off as cosecant squared of the elevation. Note that the falloff in the antenna pattern is modeled very simply. In practice, cosecant squared antenna patterns have a significant variation from this ideal. One should expect the gain to be a couple of decibels less than the directivity when the design is implemented.

Physically, the transmit antenna 4 will be relatively small. As it is intended to have uniform gain across 90 degrees and something like a cosecant squared antenna pattern when looking up, the antenna will not need many degrees of freedom. The transmit antenna could be put up next to the receive antenna, but that is not necessary. One of the advantages of FMCW is the antenna separation of the transmit and receive antennas. The transmit antenna could be located on one part of the ship or other platform and the receive antennas on another.

Referring again to FIG. 1, the receive antenna 6 is made up of a number of receive antenna elements. The receive antenna elements must cover the entire field of regard of the transmit antenna 4. They must be spaced in their receive array with approximately half-wavelength (λ/2) spacing, so the elements cannot be large. The mutual coupling between elements should be controlled so that the overall pattern on receive is not disturbed.

For this point design, a receive antenna 6 can be selected that is uniform over an octant of the sphere (quadrant of a hemisphere). The use of digital beamforming weighting will allow any desired elevation or azimuth pattern. In essence, the receive antenna element is a uniform antenna across the field of regard and zero elsewhere. Suitable adjustments can be made to accommodate physical antenna design.

The receive antenna array can be constructed in the same way as AESA arrays are constructed since the former has essentially the same requirements. The difference is that on the back end, there is no transmit amplifier to be connected to. Communications receive antenna arrays are already built in this manner.

The receive antenna 6 can also be used in dual or quad polarization configurations. On the receive side, this design can have all of the features that are used in pulse radar design.

Figure 4:
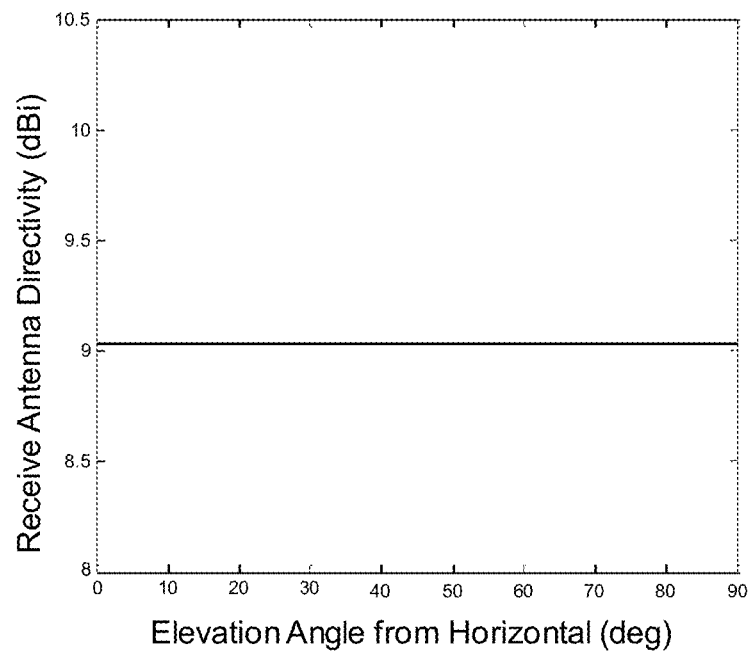
FIG. 4 is a graph showing receive antenna directivity (in dBi) versus elevation angle from horizontal (in degrees) for a uniform antenna pattern.

The receive antenna element gain is about 9 dBi because the pattern covers one octant. Compared to isotropic antenna elements, the receive antenna element proposed covers ⅛ of the sphere, so the directivity is 8 times as high as isotropic, for a directivity of $10 \log_{10}(8)=9$ dBi. The receive antenna pattern will be uniform over the quadrant of interest. FIG. 4 is a receive antenna element elevation cut showing a uniform pattern. The receive antenna elements are uniform gain over the field of regard.

Referring again to FIG. 1, the exciter 8 in the radar system generates radio frequency signals and the timing for the radar. The exciter 8 for the proposed FMCW system may be similar to those used in pulsed radar. The signal will be linear FM rather than a pulsed signal, but use of digital signal synthesis means that it can be a straightforward software change from existing exciter designs.

Features that will be somewhat different are the power level and the distribution of the signal. The exciter 8 must have sufficient power for the receive antenna array that each element has its portion of the transmit signal for mixing, and purity must be maintained. On the transmit side, the single element will require a relatively small exciter signal (≈20 mW) connected to its high-power amplifier 10.

The distribution of the signals will be relatively simple if the transmit antenna and the receive array are physically close by. If a design is desired in which they are not located near each other, it will be necessary to maintain sufficient signal strength and match the remote device to the exciter so that they are phase locked. The technology being developed of coherent addition of disparate RF sources will be able to produce a matching phased locked signal if the transmitter and the receiver are physically separated as long as the relative movement of the transmitter and receiver is not too fast.

The FMCW design proposed herein is flexible. With the introduction of Doppler FMCW, it has become possible to synthesize a variety of different FMCW waveforms, with many bearing analogies to the variety of pulsed radar waveforms. In an FMCW design, it is possible, and often desirable, to modify the following (a) linear FM sweep rate; (b) linear FM sweep time; (c) sweep repetition frequency (analogous to pulse repetition frequency); and (d) repeated slope pattern.

Figure 5:
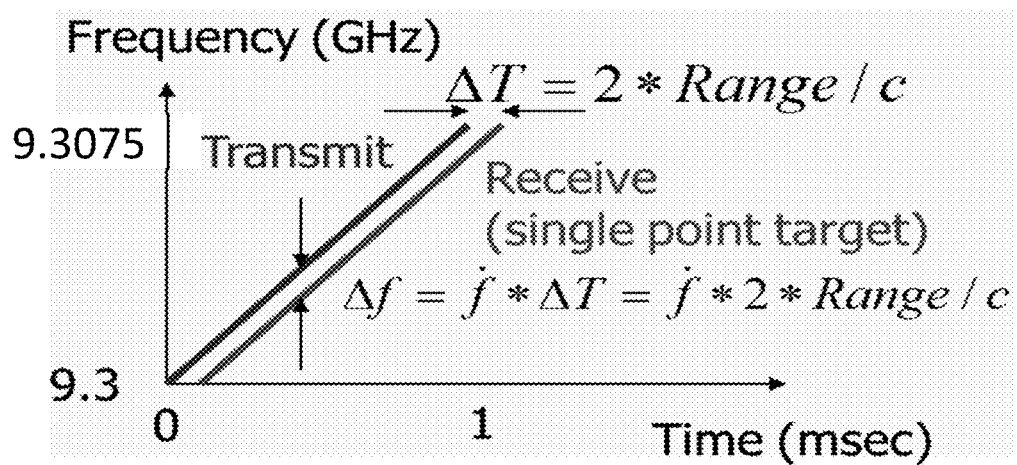
FIG. 5 is a graph showing an example of transmit and receive waveforms for a single linear FM sweep.
Figure 6:
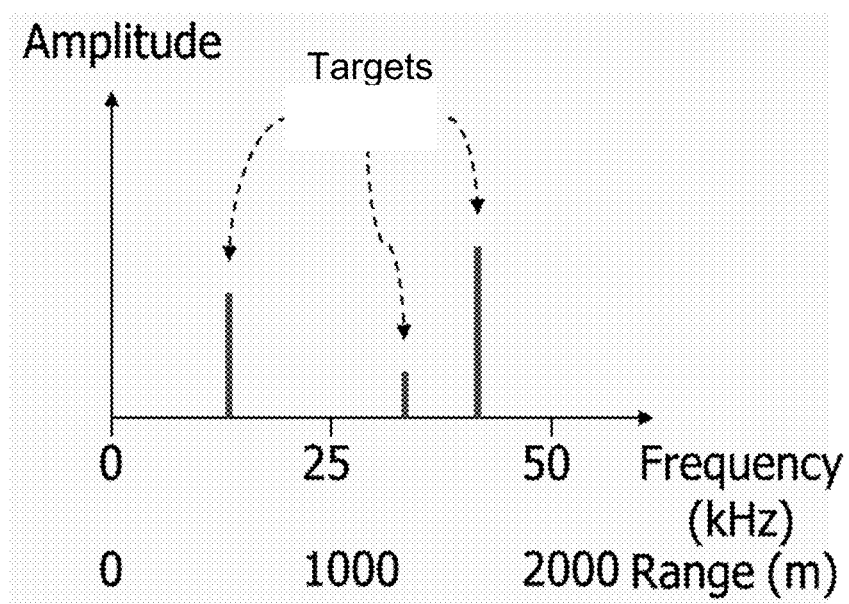
FIG. 6 is a graph showing amplitude versus frequency (in kHz) and range (in meters) for received signals from three targets.

Again referring to FIG. 1, each receiver/ADC 14 comprises an FMCW radar receiver in which a replica of the transmit signal is mixed with the receive signal by mixer 12. FIG. 5 shows an example of the transmit and receive waveforms for a single linear FM sweep. As shown in FIG. 5, the received signal after reflection from the target is delayed in time by an amount $\Delta T$ which is proportional to the target range, i.e., $\Delta T=2*Range/c$. With the mixing operation, the delay in time $\Delta T$ is transformed into a frequency shift $\Delta f$ which is proportional to the linear frequency modulation sweep rate $\dot{f}$ times the time delay $\Delta T$, i.e., $\Delta f=\dot{f}*\Delta T=\dot{f}*2*Range/c$. This means that the frequency shift after mixing is now directly proportional to target range. As shown in FIG. 6, the FMCW operation converts range bins into frequency shift. After processing, targets will show up in Doppler filters in a spectral analysis. Frequency shift is proportional to range.

In the example depicted in FIG. 5, the time-delayed (by $\Delta T$) receive signal is related to the linear FM sweep rate $\dot{f}=7.5$ MHz/2 msec$=3.75\times10^9$ Hz/sec. Setting $c=3\times10^8$ msec, then the frequency shift $\Delta f=\dot{f}*2*Range/c=25$ Hz/m and the Range=$\Delta f$/25 Hz/m. Thus, a mixing of the receive signal with a replica of the transmit signal produces a single frequency shift of 25 Hz for each meter of range.

Figure 7A:
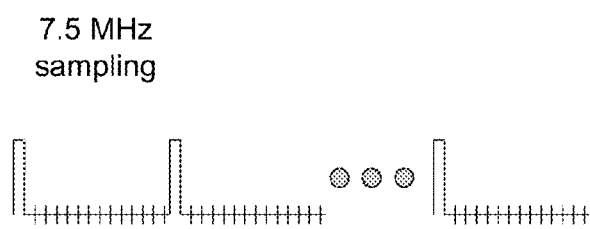
FIGS. 7A and 7B are diagrams showing the sampling which might be used by pulsed and FMCW radar systems respectively in order to achieve a 20-m-resolution over a range of 10 km.
Figure 7B:
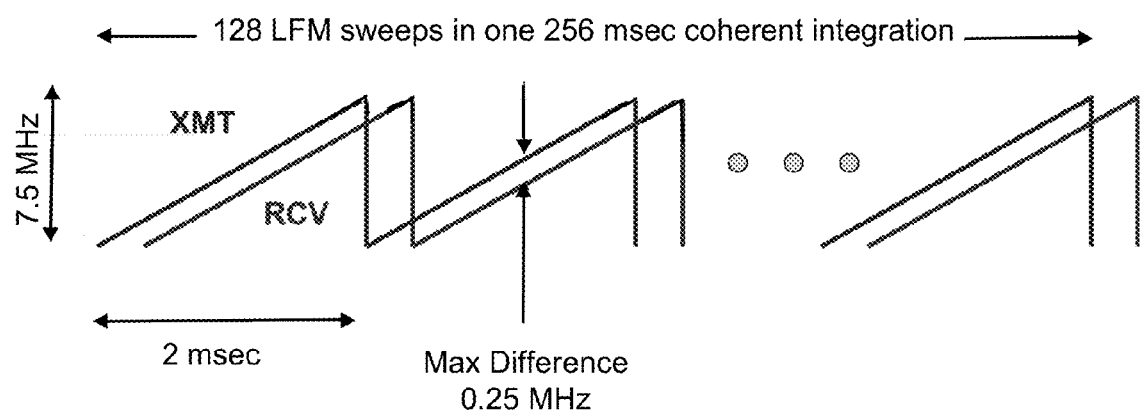

FIGS. 7A and 7B show the sampling which might be used by pulsed and FMCW systems respectively in order to achieve a 20-m-resolution over a range of 10 km. The pulsed system has a 7.5 MHz sampling rate for each of 32 channels. In contrast, the FMCW system uses multiple linear FM sweeps to integrate coherently for longer times and has only a 0.25 MHz sampling rate for each of 32 channels (maximum frequency=10,000 m*25 Hz/m=0.25 MHz). The rest of the 7.5 MHz is for ranges beyond the ranges of interest. In the example depicted in FIGS. 7A and 7B, a pulsed system is seen to require 30 times as much digital bandwidth to achieve the same 20-m resolution.

Referring again to FIG. 1, there is a separate receiver/ADC 14 for each element of the receive antenna array, so there is a large number of channels. There already exist systems with 32 simultaneous receive channels, each producing I/Q data, so operation with more channels is an evolutionary step.

Attached to the mixer 12 and likely bundled with a low-noise amplifier, the A/D converter produces I/Q samples for each of the receive antenna elements. While the data stream would be too fast to handle if the sample rate were high, the nature of FMCW allows for a low sample rate. Because the range bins are essentially converted to frequency shifts in the received signal, short-range operations have a reduced sample rate for FMCW systems. For example, if only the 5-km range is of interest, then 5-m range bins would require only 1000 range bins and 20-m range bins would require only 250 range bins. Since the number of range bins translates into the number of samples for each sweep, the effective I/Q sample rates are much lower than for equivalent pulsed systems. If data is collected over 2-msec sweeps, for example, then the 1000 range bin example requires a sample rate of 0.5 Mcomplexsamples/sec and the 250 range bin example requires only 0.125 Mcomplexsamples/sec.

The physical implementation of the A/D converter can use any A/D conversion technique, assuming sufficient digital resolution. It may even be feasible to time share faster A/D converters among multiple receive channels. A single A/D converter that would handle 100 Mcomplex samples/sec, for example, could be time shared among 200 of the 5-m range bins described earlier or 800 of the 20-m range bins.

It may be feasible to cancel the FMCW transmit signal from the receive signal adaptively. Isolation between transmit and receive is often a significant limitation on the detection range of FMCW radars.

Most of the operation of the radar is the signal processing that takes place. The fact that so much of the radar is signal processing means that the radar is extremely flexible. Radar waveforms, receive beams, and even active cancellation can be applied and modified as much as desired. In FIG. 1, the arrow exiting the receiver/ADC 14 and all arrows downstream represent digital signals, so everything beyond the A/D converter is implemented in signal processing by the computer system 2.

The signals received by the receive antenna elements are formed into simultaneous receive antenna beams in a two-step process. The first step of this process is azimuth beam formation; the second step is elevation beam formation. These operations are respectively performed by the azimuth and elevation beam formation modules of the computer system. One embodiment of the beamforming process and variations thereof will now be described.

Azimuth Beam Formation

For each row of the receive antenna array, the elements can be considered as having a progressive phase shift from element to element. Each of the receive antenna elements has a pattern that, of necessity, covers the entire radar field of regard. (As used herein, the term "pattern" refers to an antenna pattern, i.e., it refers to the gain of the antenna (antenna element in this case) for all azimuth and elevation angles.) By applying a complex vector multiplication with the sample from each element in the given row, the system can form a narrow azimuth beam pointed at a specific azimuth angle in space. Basically, there is one sample for each receive antenna element in a row of the array. The samples for one row form a sample set. All the samples of a sample set are for the same time. In other words, for each time, there is a respective azimuth beam formed for the row. The azimuth beam can be thought of as a spatial transform for a fixed time. A respective azimuth beam is formed at each sample time for each row of receive antenna elements.

Figure 8A:
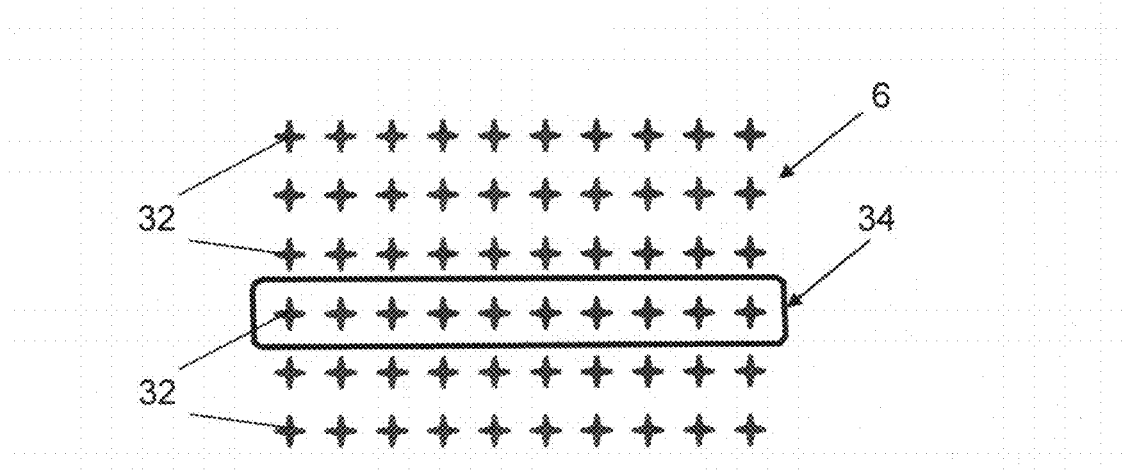
FIG. 8A is a diagram showing elements of a receive antenna in a 6×10 array.

For the purpose of illustration, FIG. 8A shows a 6×10 array of receive antenna elements 32. One row 34 of receive antenna elements 32 is surrounded by a bold rectangle (with rounded corners) in FIG. 8A. (The concepts disclosed herein are applicable to receive antennas having any number of elements in a row and any number of rows.) The signals received by the receive antenna elements in any row 34 are converted into samples which are processed to form an azimuth beam. The azimuth beam formation is carried out identically for each row 34 in the array.

Figure 8B:
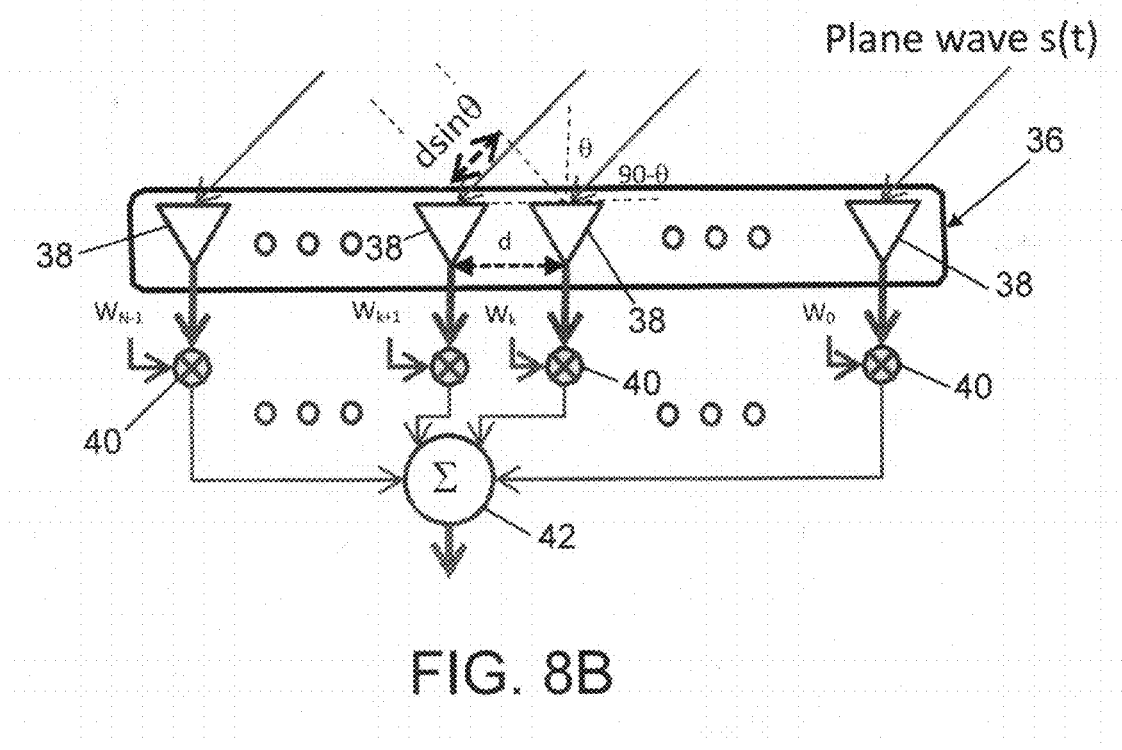
FIG. 8B is a diagram showing a process of forming a single narrow azimuth beam by computing a complex vector inner product based on the samples output by one row of antenna horns of the receive antenna array partly depicted in FIG. 8A.

Referring to FIG. 8B, the process of azimuth beam formation can be described with reference to the signals (i.e., samples) output from a row 36 of antenna horns 38 having a spacing d. FIG. 8B. shows a process of forming a single narrow azimuth beam by computing a complex vector inner product based on a plane wave s(t) received by the antenna horns 38 in row 36. (The receiver/ADC for each receive channel is not shown in FIG. 8B, but is located between antenna horn 38 and multiplier 40.) The signal output from the k-th antenna horn 38 in row 36 is represented by the following equation:

$$s_k(t)=s(t)e^{-j2\pi kd \sin \theta/\lambda}$$

The signals $s_k(t)$ output by antenna horns 38 (after analog-to-digital conversion) are sent to respective multipliers 40 for multiplying by respective complex weights $w_k$; the products are then summed by a summer 42 to form an azimuth beam:

$$\text{beam}(t) = \sum_{k=0}^{N-1} w_k s_k(t) = s(t)\sum_{k=0}^{N-1} w_k e^{-j2\pi kd \sin\theta/\lambda}$$

The beam created here can be adjusted to point at any desired angle by the choice of the phases of the complex weights $w_k$. The equation for this beam can also be written in vector notation as $$\text{beam}(t)=s(t)*\overline{w}^T*\overline{s}$$

where $$\overline{s}=[s_0 \ldots s_k s_{k+1} \ldots s_{N-1}]^T$$

and $$s_k=e^{-j2\pi kd \sin \theta/\lambda}$$

If one chooses the complex weights $w_k$ to be $$w_k + e^{+j2\pi kd \sin \theta_0/\lambda}$$

then the radar system is aiming the receive beam at an angle $\theta_0$:

$$\text{beam}(t) = s(t)\sum_{k=0}^{N-1} w_k e^{-j2\pi kd \sin\theta/\lambda}$$

$$= s(t)\sum_{k=0}^{N-1} e^{+j2\pi kd \sin\theta_0/\lambda} e^{-j2\pi kd \sin\theta/\lambda}$$

$$= s(t)\sum_{k=0}^{N-1} e^{+j2\pi kd(\sin\theta-\sin\theta_0)/\lambda}$$

If one selects $\theta_0=0$ in the above choice for the complex weights $w_k$, one gets simply $$\text{beam}(t)=Ns(t)$$

This is what is expected because the addition of the signals from the elements is a coherent signal addition. In this case, the system is lined up to cancel the phase progression from antenna element to antenna element. In addition, the beam degrades when scanned away from the normal to the antenna face.

If one wishes to form multiple beams simultaneously from this data, the foregoing process is repeated on the original antenna element samples with a different complex weight vector that points in another direction. Mathematically, instead of multiplying the sample (at a single time) from each element, in the row (constituting a vector) by a vector to get a scalar (inner product), that vector will now be multiplied by a matrix whose vectors are tailored to the individual beam positions that one wishes to create.

This can be described mathematically by describing a set of weights w aimed or pointing at an angle $\theta_m$ as $\overline{w}_{\theta_m}$, which is the column vector in which $$w_k = e^{+j2\pi kd \sin \theta_m/\lambda}$$

and the matrix $$\overline{W}=[\overline{w}_{\theta_0} \ldots \overline{w}_{\theta_m}\overline{w}_{\theta_{m+1}} \ldots \overline{w}_{\theta_{M-1}}]$$

for m=0, 1, ..., M−1.

The creation of the beams is described by $$\text{beams}(t)=\overline{W}^T\overline{s}$$

The way this is described, there are M azimuth beams produced from N antenna elements lined up for the row of interest. The azimuth beams are narrow in azimuth but wide in elevation.

It may be possible to reduce the computational load by treating this spatial transformation from elements to azimuth beams like a Fourier transform. The form of the equations is very similar to that of the Fourier transform, although the spacing between beams is not an exact match for the Fourier Transform, but it may be feasible to develop a mathematical approach that reduces the computation load for beamforming by a factor of 5 or so.

Elevation Beam Formation

The M azimuth beams are then sent separately (without being combined) to the elevation beam formation module, which combines the outputs of the azimuth beams that were previously formed from the signals received by the rows of receive antenna elements. The operation of the elevation beam formation module is similar to what was done in the azimuth beam formation module except that the input is the azimuth beams rather than the samples from the row elements and the weighting is done in the vertical rather than horizontal dimension.

The elevation beam formation can be done in anyone of a multiplicity of ways. For the purpose of illustration, two embodiments are described herein which entail different computational loads:

(1) As already described in detail with reference to FIG. 1, a respective plurality of pencil beams can be created from each narrow azimuth beams. For example, 32 pencil beams can be formed for each of 32 narrow azimuth beams, resulting in a total of 1,024 pencil beams for each sample time. The mathematical details of the elevation beam formation will not be described here because the equations have the same form as it was the case for azimuth beam formation. This first alternative involves much greater calculation than the second alternative, but has performance advantages.

(2) In accordance with an alternative embodiment, the computer system may be programmed to create a respective fan beam for each narrow azimuth beam using a cosecant square pattern to allow receive detection of all targets. This enables target detection. If targets are detected, additional pencil beams are formed to determine the elevation angle to those targets. The signal processing for this alternative embodiment is shown in FIG. 11.

Figure 11:
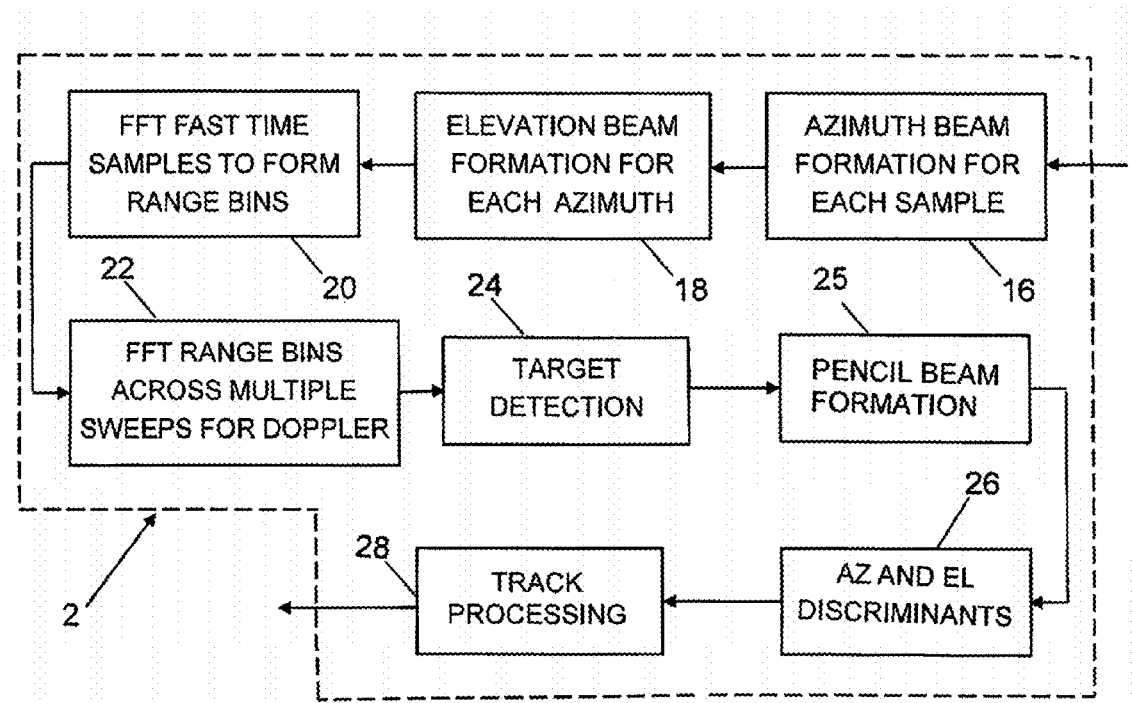
FIG. 11 is a block diagram showing signal processing in accordance with an alternative embodiment.

Referring to FIG. 11, the digital samples are formed into narrow azimuth beams by the same azimuth beam formation module 16 described previously. An elevation fan beam formation module 19 then forms a respective fan beam for each narrow azimuth beam using a cosecant square pattern. In this alternative elevation beam formation, one starts with the creation of a weighting w that will produce the desired cosecant squared pattern in the elevation dimension. This requires only one fan beam for each narrow azimuth beam. The result of digital beamforming operations is a multiplicity of fan beams covering the field of regard for each sample time. For example, in the case of a 32×32 receive antenna array, 32 narrow azimuth beams may be formed and then 32 fan beams may be formed.

The fan beams are then processed by the range binning module 20 and the Doppler processing module 22 as previously described. The output of the Doppler processing module 22 is processed by the target detection module 24. If the target detection process determines that there are targets in a particular fan beam (i.e., a narrow azimuth, broad elevation beam), then the computer system 2 goes to another stage in which the target elevation angle is computed. The pencil beam formation module 25 (see FIG. 11) repeats the beam calculation process for those narrow azimuth beams in which targets were detected by target detection module 24. If, for example, only a few of the azimuth beams register targets, then the formation of the full set of elevation beams need only be done for those azimuth beams. This results in a reduction of computational load by a factor of perhaps 20 compared with forming all the pencil beams across the entire field of regard. This reduced number of pencil beams are then processed by the angle discrimination module 26 as previously described. The angle discrimination module 26 computes the azimuth and elevation angles with greater resolution for any pencil beam for which a target was detected.

The foregoing approach allows the system to avoid most of the elevation beam computation (perhaps 95% of the computation) by doing a detection based on the computation of a single receive beam in elevation, this one tailored to match the transmit beam elevation pattern. The penalty for doing this is the reduction in the peak receive gain, which is on the order of 1 dB (perhaps a reduction of 5% of detection range). In this approach, only the single receive elevation beam is made from the azimuth beams formed from each of the rows. This single beam will allow the detection of targets, but will not provide much useful elevation information. To get the elevation target angle, the system computes pencil beams, but only for those azimuth angles for which targets were detected. For example, if there is only one azimuth angle for which there is a target, the pencil beams for any other azimuth angles do not need to be computed. Although certainly target dependent, this may offer the aforementioned 95% computation reduction with only a small reduction in detection range.

Yet another option to explore is, after target detection, using an algorithm, such as the multiple signal classification (MUSIC) algorithm, to determine the target elevation angle from the narrow azimuth beams directly rather than forming multiple elevation beams. The MUSIC algorithm estimates the frequency component of a signal using an eigenspace method.

Jammer nulling, both open loop and closed loop, can be done at this stage during the beam formation by the choice of weights w for the receive antenna. There are a number of techniques for jammer cancellation that are applicable. All that is necessary is to choose the weights w so that nulls are placed at jammer locations and the antenna beams achieve sufficient gain in the desired directions.

Target Detection

Following Doppler processing, the Doppler frequency shifts are sent to the target detection module 24. The target detection process bears some similarity to that of other types of radar, but there are some significant advantages to target detection allowed by the continuous target updates. In a scanned radar system of any type, whether mechanical, passive electronic, or active electronic, the radar searches a limited sector of the field of regard, generally a pencil beam, for each set of looks. This allows higher gain on transmit, but means that target updates are not continuous. With an AESA radar, alert/confirm improves detection performance significantly, but requires the radar to spend some of its time performing the confirm phase. Continuous updating allows significantly greater detection improvement than possible with even alert/confirm.

The radar system disclosed herein provides continuous updates everywhere in the field of regard, which allows detection processing to be set with an M of N detection threshold where M and N can be fairly large because they do not negatively impact the radar timeline. For example, a 6 of 20 criterion for detection, assuming that each coherent integration is 100 msec, would require 2 seconds to get the 20 possible updates. If 6 were detections, then the system would start a track on the target and update the track every coherent integration time. A mechanically scanned or an electronically scanned antenna does not get continuous updates, so cannot effectively use such a criterion for detection. An AESA can extend such searches in confirm phases in theory, but in practice this interrupts the radar timeline to the level that it cannot be done effectively. The M of N detection for the proposed radar will make an improvement of several dB more than feasible with an AESA system. To be sure, that improvement is needed to make up for the lower gain on transmit with the radar system proposed herein.

For the detection range calculations, one can assume that the required SNR from each coherent integration interval is only 6 dB. This allows for the improvement available with the M of N detection.

Angle Discrimination

Once detection is achieved for a target, the computer can employ an angle discrimination module to locate the target with greater resolution. Azimuth and elevation angle discriminants and the tracker are used to determine the angular accuracy of the system. For detection of targets, a monopulse is not necessary to achieve a stare-while-scan radar.

There are several approaches to obtaining the angle discriminants. Two examples will be described here. The first is the MUSIC algorithm and the second is a superresolution (better than a beamwidth accuracy) technique based on multiple overlapping beams.

The MUSIC algorithm determines the angle to a target precisely, but at the cost of some computational loading.

Figure 9:
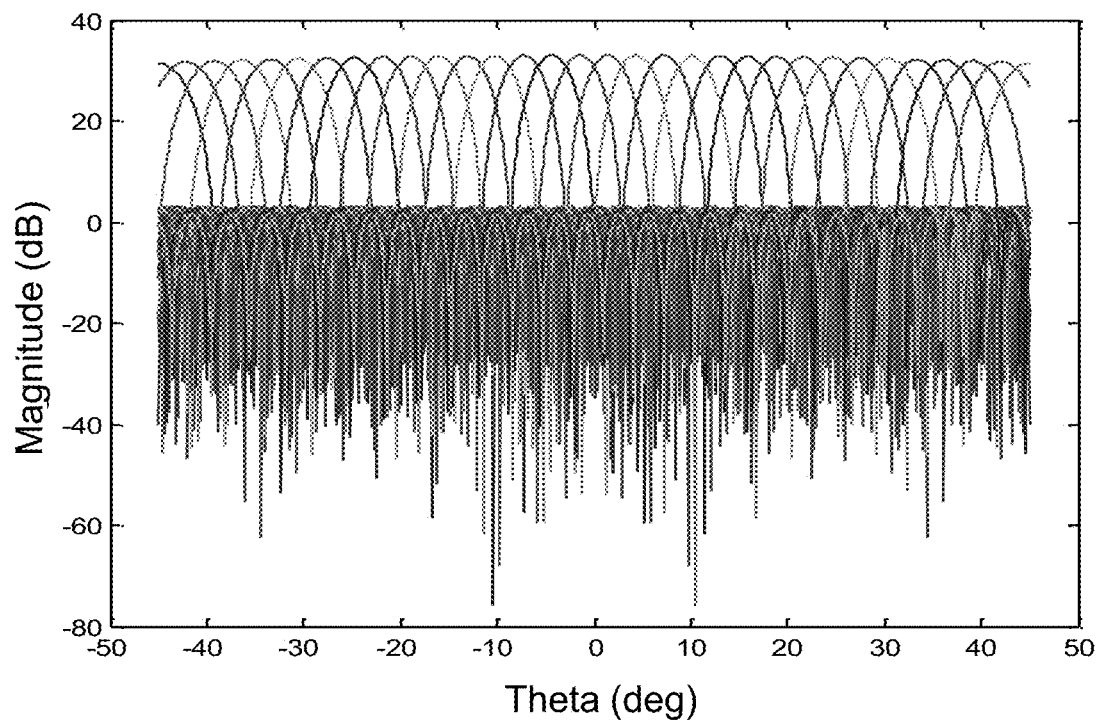
FIG. 9 is a graph of receive azimuth beam magnitude (dB) versus azimuth angle θ (deg) for overlapping receive azimuth beams in digital beamforming.

However, given multiple overlapping beams for the radar receiver, it is possible to develop simple angle discriminant measures that are at least as accurate, and likely better, than monopulse radar antennas. FIG. 9 shows the results with 32 simultaneous overlapping receive azimuth beams. For this example, 32 digital azimuth beams simultaneously cover ±45°. The beams are a little weaker at higher angles because the effective receive area is reduced.

One can create a simple algorithm to demonstrate the simplicity of creating azimuth and elevation angle discriminants in a multi-beam system. Let A be the strongest signal (in a particular angle/range bin) from any of the multiple receive beams for a detection. Let B be the signal that is next strongest. It will always be the next beam because the antenna response falls off relatively fast beyond the next beam. Then one needs to have a scaling based on antenna gain as the signals fall off as the target is further from a normal to the face of the receive antenna. This scaling can be characterized simply as antenna gain (azimuth)/Max (antenna gain). One can now form a discriminant $[(|A|-|B|)/(|A|+|B|)]/Scaling$.

Figure 10:
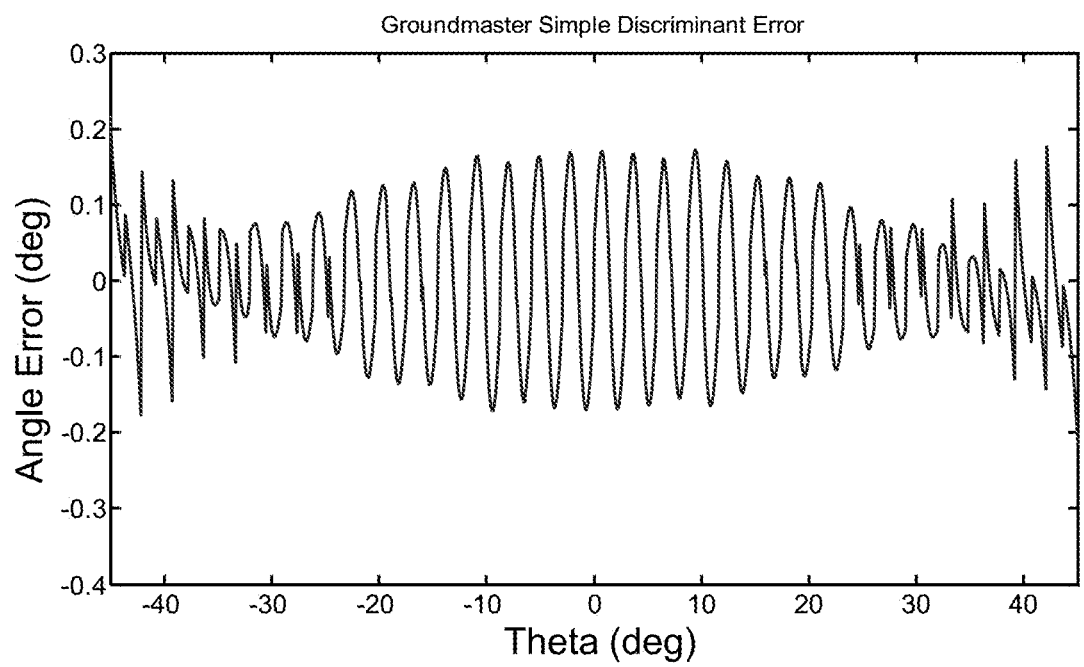
FIG. 10 is a graph of multibeam angle error (deg) versus azimuth angle θ (deg) for one implementation.

FIG. 10 shows the low error from using that simple discriminant. For high SNR, the angular accuracy of even the simplest discriminant is low for multi-beam systems. In developing a multi-beam radar, there would be more calibration steps to further reduce systematic errors. In practice with multi-beam radars against ground targets, one sigma tracking accuracies of 1/30 to 1/60 of the beamwidth can be achieved, which is about twice as good as monopulse systems. This can be done in both azimuth and elevation.

Target Tracking

Following target detection and angle discrimination, the target tracking module of the computer system tracks the moving target. Another of the advantages of multi-beam radars is the continuous update of tracks. The entire field of regard gets a track update for every coherent integration period. In testing against scanning radars (mechanically scanned radars), the multi-beam radar produced updates 50 times faster and had accuracy improved by a factor of two.

As used herein, the term "continuous updates" means that the update time for every target in the radar field of regard is equal to the coherent integration interval. For the type of targets in point missile defense, the coherent integration time is likely to be 50 to 100 msec.

Clearly, the faster update rate provides more updates and thus improved track accuracy. In addition, the continuous updates should allow the tracker to achieve much better accuracy during target maneuvers. Because of the continuous updates, target maneuvers should be recognized significantly earlier and appropriate adjustments in tracker parameters will be feasible.

The radar systems disclosed above do not get overloaded as more tracks are added, subject only to the processing limitations of the computer system being used for the tracker. With an active ESA radar, the radar does not have any lag in positioning a beam, but required tracking is essentially stealing time from the search function. Beyond some level of simultaneous tracks, stealing the search timeline will cause degradation of the search process. With the multi-beam antenna described above, all tracks get an update every coherent integration time, so there is no degradation of the search timeline, that is, no tradeoff between search and track.

Target Identification

Target identification generally requires a higher bandwidth waveform to get better resolution. For example, an identification may involve a very detailed range resolution of better than one meter. The radar system proposed herein can accomplish this, but at the expense of not being able to cover the full-range swath. This is typical for radar systems.

If target identification is to be done, it would likely be performed by adjusting the transmit waveform to be a high-bandwidth waveform, and then listening to range bins around the range for the target prediction. The antenna beams used would likely be planned in advance based on the track file information for the target of interest.

In accordance with one embodiment, multiple multi-beam FMCW radars can be operated simultaneously to cover an entire hemisphere. There are always challenges when operating multiple radars close together, either in a round-robin approach in time, by assigning separate RF frequencies to adjacent radars, or having sufficient isolation that the radars can operate simultaneously. The allowable separation of transmitters and receivers will be a good first step in making the radars interoperable. There are a number of alternatives for operation of several radars to cover a region. This is a challenge that has been solved for a number of radars previously and is soluble for this type of radar as well.

While radar systems and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

In addition, the method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The structure corresponding to the means for converting analog signals into digital samples recited in the claims includes a single analog-to-digital converter that receives analog signals sequentially, a multiplicity of analog-to-digital converters that receive analog signals concurrently, and equivalents thereof.

The invention claimed is:

1. A method for simultaneous detection of multiple short-range targets using radar, comprising:
   (a) illuminating a wide field of regard with frequency-modulated continuous wave radar signals comprising a sequence of linear frequency-modulated sweeps using a transmit antenna;
   (b) for each linear frequency-modulated sweep of said sequence, receiving radar signals reflected from the field of regard within a short range using a receive antenna array having a multiplicity of antenna elements;
   (c) converting the reflected radar signals into a respective multiplicity of pencil beams for each linear frequency-modulated sweep of said sequence using two-dimensional beamforming; and
   (d) for each linear frequency-modulated sweep of said sequence, detecting any pencil beams of said multiplicity of pencil beams having a characteristic indicative that radar signals were reflected from a target in the field of regard,
   wherein said two-dimensional beamforming and said target detection are performed by a computer system.

2. The method as recited in claim 1, wherein step (c) comprises:
   converting the received radar signals into respective digital in-phase and quadrature samples for each antenna element;
   forming a respective multiplicity of simultaneous azimuth beams from said digital in-phase and quadrature samples for each linear frequency-modulated sweep of said sequence, said azimuth beams of each multiplicity being aimed at respective azimuth angles; and
   forming the respective multiplicity of pencil beams from said azimuth beams for each linear frequency-modulated sweep of said sequence using elevation beamforming.

3. The method as recited in claim 1, wherein step (d) comprises:
   forming a multiplicity of range bins for each pencil beam;
   Doppler processing said range bins across multiple linear frequency-modulated sweeps; and
   computing a range of the target based on results of said Doppler processing.

4. The method as recited in claim 1, further comprising starting a track on the target when an M of N target detection threshold is reached, where M and N are positive integers and M<N.

5. The method as recited in claim 4, further comprising continuously updating the track on the target.

6. The method as recited in claim 5, wherein the track is continuously updated every coherent integration time.

7. The method as recited in claim 1, further comprising computing azimuth and elevation angles of the target using angle discrimination.

8. The method as recited in claim 1, wherein the transmit antenna and the receive antenna array are at different locations.

9. A radar system capable of simultaneous detection of multiple short-range targets, comprising:
   an exciter capable of generating frequency-modulated continuous wave radio frequency signals comprising a sequence of linear frequency-modulated sweeps;
   a receiver comprising a multiplicity of mixers for mixing radio frequency signals with replicas of said frequency-modulated continuous wave radio frequency signals and outputting analog signals;
   one or more antennas for converting frequency-modulated continuous wave radio frequency signals generated by said exciter into electromagnetic waves and converting returned electromagnetic waves into radio frequency signals which are sent to said receiver;
   means for converting analog signals from said receiver into digital samples;
   a digital azimuth beamformer that forms a multiplicity of narrow azimuth beams from digital samples produced for each linear frequency-modulated sweep;
   a digital elevation beamformer that forms a multiplicity of pencil beams from the multiplicity of narrow azimuth beams produced for each linear frequency-modulated sweep; and
   a digital signal processor programmed to detect any pencil beams of said multiplicity of pencil beams having a characteristic indicative that radar signals were reflected from a target in the field of regard for each linear frequency-modulated sweep.

10. The radar system as recited in claim 9, wherein said digital signal processor is programmed to perform the following operations:
    forming a multiplicity of range bins for each pencil beam;
    Doppler processing said range bins across multiple linear frequency-modulated sweeps; and
    computing a range of the target based on results of said Doppler processing.

11. The radar system as recited in claim 9, further comprising a track processor programmed to start a track on the target when an M of N target detection threshold is reached, where M and N are positive integers and M<N.

12. The radar system as recited in claim 11, wherein said track processor is further programmed to continuously update the track on the target.

13. A method for simultaneous detection of multiple short-range targets using radar, comprising:
    (a) illuminating a wide field of regard with frequency-modulated continuous wave radar signals comprising a sequence of linear frequency-modulated sweeps using a transmit antenna;
    (b) for each linear frequency-modulated sweep of said sequence, receiving radar signals reflected from the field of regard within a short range using a receive antenna array having a multiplicity of antenna elements;

(c) converting the reflected radar signals into a respective multiplicity of fan beams for each linear frequency-modulated sweep of said sequence using two-dimensional beamforming;

(d) for each linear frequency-modulated sweep of said sequence, detecting any fan beams of said multiplicity of fan beams having a characteristic indicative that radar signals were reflected from a target in the field of regard; and (e) forming a multiplicity of pencil beams for any fan beam for which a target was detected, wherein said two-dimensional beamforming and steps (d) and (e) are performed by a computer system.

14. The method as recited in claim 13, wherein step (d) comprises:

forming a multiplicity of range bins for each pencil beam;

Doppler processing said range bins across multiple linear frequency-modulated sweeps; and computing a range of the target based on results of said Doppler processing.

15. The method as recited in claim 13, further comprising starting a track on the target when an M of N target detection threshold is reached, where M and N are positive integers and M<N.

16. The method as recited in claim 15, further comprising continuously updating the track on the target.

17. The method as recited in claim 16, wherein the track is continuously updated every coherent integration time.

18. The method as recited in claim 13, further comprising computing azimuth and elevation angles of the target using angle discrimination for any pencil beams of said multiplicity of pencil beams having a characteristic indicative that radar signals were reflected from a target in the field of regard.

19. A radar system capable of simultaneous detection of multiple short-range targets, comprising:

an exciter capable of generating frequency-modulated continuous wave radio frequency signals comprising a sequence of linear frequency-modulated sweeps;

a receiver comprising a multiplicity of mixers for mixing radio frequency signals with replicas of said frequency-modulated continuous wave radio frequency signals and outputting analog signals;

one or more antennas for converting frequency-modulated continuous wave radio frequency signals generated by said exciter into electromagnetic waves and converting returned electromagnetic waves into radio frequency signals which are sent to said receiver;

means for converting analog signals from said receiver into digital samples;

a digital azimuth beamformer that forms a multiplicity of narrow azimuth beams from digital samples produced for each linear frequency-modulated sweep;

a first digital elevation beamformer that forms a multiplicity of fan beams from the multiplicity of narrow azimuth beams produced for each linear frequency-modulated sweep;

a digital signal processor programmed to detect any fan beams of said multiplicity of pencil beams having a characteristic indicative that radar signals were reflected from a target in the field of regard for each linear frequency-modulated sweep; and a second digital elevation beamformer that forms a multiplicity of pencil beams for any fan beam for which a target was detected.

20. The radar system as recited in claim 19, further comprising digital angle discrimination means for computing azimuth and elevation angles of the target for any pencil beams of said multiplicity of pencil beams having a characteristic indicative that radar signals were reflected from a target in the field of regard.

* * * * *